US007063150B2

(12) United States Patent
Slabaugh et al.

(10) Patent No.: US 7,063,150 B2
(45) Date of Patent: Jun. 20, 2006

(54) METHODS FOR PREPARING SLURRIES OF COATED PARTICULATES

(75) Inventors: Billy Slabaugh, Duncan, OK (US); Jimmie D. Weaver, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 314 days.

(21) Appl. No.: 10/723,417

(22) Filed: Nov. 25, 2003

(65) Prior Publication Data

US 2005/0109506 A1    May 26, 2005

(51) Int. Cl.
    E21B 43/04    (2006.01)
(52) U.S. Cl. ........................ 166/278; 166/276; 166/295
(58) Field of Classification Search ..................... None
    See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | |
| 2,869,642 A | 1/1959 | McKay et al. | |
| 3,047,067 A | 7/1962 | Williams et al. | |
| 3,123,138 A | 3/1964 | Robichaux | 166/33 |
| 3,176,768 A | 4/1965 | Brandt et al. | |
| 3,199,590 A | 8/1965 | Young | 166/33 |
| 3,272,650 A | 9/1966 | MacVittie | |
| 3,297,086 A | 1/1967 | Spain | 166/33 |
| 3,308,885 A | 3/1967 | Sandiford | 166/33 |
| 3,316,965 A | 5/1967 | Watanabe | |
| 3,375,872 A | 4/1968 | McLaughlin et al. | |
| 3,404,735 A | 10/1968 | Young et al. | 166/33 |
| 3,415,320 A | 12/1968 | Young | |
| 3,492,147 A | 1/1970 | Young et al. | |
| 3,659,651 A | 5/1972 | Graham | |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,127,173 A * | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |

(Continued)

FOREIGN PATENT DOCUMENTS

CA    2063877    5/2003

(Continued)

OTHER PUBLICATIONS

Halliburton, *CoalStim^SM Service, Helps Boost Cash Flow From CBM Assets,* Stimulation, HO3679 Oct. 3, 2003, Halliburton Communications.

Halliburton, *Conductivity Endurance Technology For High Permeability Reservoirs, Helps Prevent Intrusion of Formation Material Into the Proppant Pack for Improved Long-term Production,* Stimulation, 2003, Halliburton Communications.

(Continued)

Primary Examiner—Zakiya W. Bates
(74) Attorney, Agent, or Firm—Robert A. Kent; Baker Botts

(57) ABSTRACT

Methods of creating a stable slurry of coated particulates wherein the slurry is capable of being stored for at least 2 hours before use comprising the steps of: providing resin coated particulates wherein the resin comprises a resin that does not completely cure unless it is at least one of exposed to a temperature above about 175° F. or exposed to an external catalyst; and, substantially suspending the resin coated particulates in a servicing fluid to create a stable resin coated particulate slurry. Methods of creating a stable slurry of coated particulates wherein the slurry is capable of being stored for at least 2 hours before use comprising the steps of: providing tackifier coated particulates; and, substantially suspending the tackifier coated particulates in a servicing fluid to create a tackifier coated particulate slurry.

16 Claims, No Drawings

U.S. PATENT DOCUMENTS

| | | | |
|---|---|---|---|
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/276 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,306,998 A | 4/1994 | Nakamura | 528/12 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/212 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |

| Patent No. | Date | Inventor | Class |
|---|---|---|---|
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/276 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,644 B1 | 5/2001 | Jain et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B1 | 12/2001 | Chatterji et al. | 166/295 |
| 6,350,309 B1 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B1 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B1 | 12/2002 | Brothers et al. | 106/692 |
| 6,494,263 B1 | 12/2002 | Todd | 166/312 |
| 6,503,870 B1 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,552,333 B1 | 4/2003 | Storm et al. | 250/269.3 |
| 6,554,071 B1 | 4/2003 | Crook et al. | 166/293 |
| 6,555,507 B1 | 4/2003 | Chatterji et al. | 507/219 |
| 6,569,814 B1 | 5/2003 | Brady et al. | 507/201 |
| 6,582,819 B1 | 6/2003 | McDaniel et al. | 428/402 |
| 6,593,402 B1 | 7/2003 | Chatterji et al. | 524/7 |

| | | | |
|---|---|---|---|
| 6,599,863 B1 | 7/2003 | Palmer et al. | 507/219 |
| 6,608,162 B1 | 8/2003 | Chiu et al. | 528/129 |
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1 | 5/2005 | Nguyen et al. | 507/221 |
| 6,978,836 B1 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1* | 1/2005 | Justus et al. | 166/295 |
| 2005/0006096 A1 | 1/2005 | Nguyen et al. | 166/295 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages, undated.

Halliburton "*CobraFrac$^{SM}$ Service, Coiled Tubing Fracturing—Cost-Effective Method for Stimulating Untapped Reserves*", 2 pages, 2004.

Halliburton "*CobraJetFrac$^{SM}$ Service, Cost-Effective Technology That Can Help Reduce Cost per BOE Produced, Shorten Cycle time and Reduce Capex*", undated.

Halliburton Cobra Frac Advertisement, 2001.

Halliburton "*SurgiFrac$^{SM}$ Service, a Quick and cost-Effective Method to Help Boost Production From Openhole Horizonal Completions*", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling,* South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation By Pressure Pulse"*, SPE 63035, 2000.

Nguyen et al., *New Guidelines For Applying Curable Resin-Coated Proppants*, SPE Paper No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Characterization of Substituted Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch. 12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective In Level 1 Dual-Lateral Completion"* SPE 78697, 2002.

Albertsson et al.,*"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid For High-Temperature Applications"*, SPE 80236, 2003.

*Chelating Agents*, Encyclopedia of Chemical Technology, vol. 5 (764-795), undated.

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, *"What is Coalbed Methane?"* CDX, LLC. Available @ www.cdxgas.com/what.html, printed p. 1, undated.

Halliburton brochure entitled "H2Zero™ Service Introducing The Next Generation of cost-Effective Conformance Control Solutions", 2002.

Halliburton brochure entitled INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages, undated.

Foreign search report and opinion (CPW 21582 EP), Mar. 11, 2005.

* cited by examiner

METHODS FOR PREPARING SLURRIES OF COATED PARTICULATES

BACKGROUND OF THE INVENTION

1. Field of the Invention

The present invention involves coated proppant slurries and using such slurries in subterranean applications such as production enhancement and sand control. More particularly, the present invention relates to stable resin-coated proppant suspensions that need not be immediately used once they are formed.

2. Description of Related Art

Servicing fluids comprising particulates are used in a variety of operations performed on subterranean wells, such as production stimulation operations like fracturing and well completion operations like gravel packing. Often, it is desirable for such particulates to consolidate into a permeable pack or mass. One method of achieving such consolidation involves coating the particulates with a curable resin before they are used in a subterranean operation so that they consolidate once down hole.

One example of a production stimulation operation using a servicing fluid having particulates suspended therein is hydraulic fracturing, wherein a formation is treated to increase its permeability by hydraulically fracturing the formation to create or enhance one or more cracks or "fractures." Such hydraulic fracturing is usually accomplished by injecting a viscous fracturing fluid into the subterranean formation at a rate and pressure sufficient to cause the formation to break down and produce one or more fractures or enhance one or more natural fractures. The fracture or fractures may be horizontal or vertical, with the latter usually predominating, and with the tendency toward vertical fractures increasing with the depth of the formation being fractured. The fracturing fluid is generally a highly viscous gel, emulsion, or foam that comprises a particulate material often referred to as proppant. In some fracturing operations, commonly known as "water fracturing" operations, the fracturing fluid viscosity is somewhat lowered, the proppant concentration is in the range of from about 0.5 to about 2 pounds per gallon, and the proppant remains in suspension because the fracturing fluid is injected into the formation at a substantially higher velocity. Whether a highly viscous fluid or a less viscous fluid with a higher velocity is used, proppant is deposited in the fracture and functions, inter alia, to hold the fracture open while maintaining channels through which produced fluids can flow upon completion of the fracturing treatment and release of the attendant hydraulic pressure.

An example of a well completion operation using a treating fluid containing particulates is gravel packing. Gravel packing treatments are used, inter alia, to reduce the migration of unconsolidated formation particulates into the well bore. In gravel packing operations, particles known in the art as gravel are carried to a well bore by a hydrocarbon or water carrier fluid. That is, the particulates are suspended in a carrier fluid, which may be viscosified, and the carrier fluid is pumped into a well bore in which the gravel pack is to be placed. The carrier fluid leaks off into the subterranean zone and/or is returned to the surface while the particulates are left in the zone. The resultant gravel pack acts as a filter to separate formation sands from produced fluids while permitting the produced fluids to flow into and through the well bore. Typically, gravel pack operations involve placing a gravel pack screen in the well bore and packing the surrounding annulus between the screen and the well bore with gravel designed to prevent the passage of formation sands through the pack. The gravel pack screen is generally a filter assembly used to support and retain the gravel placed during the gravel pack operation. A wide range of sizes and screen configurations are available to suit the characteristics of a well bore, the production fluid, and the subterranean formation sands. When installing the gravel pack, the gravel is carried to the formation in the form of a slurry by mixing the gravel with a viscosified carrier fluid. Once the gravel is placed in the well bore, the viscosity of the carrier fluid is reduced and it is returned to the surface. Such gravel packs are used to stabilize the formation while causing minimal impairment to well productivity. The gravel, inter alia, acts to prevent formation sands from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to reduce formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

In order to prevent the subsequent flowback of proppant, gravel or other unconsolidated particulates with the produced fluids, a portion of the particulate introduced into the fractures or gravel packs may be coated with a hardenable resin composition. In the case of a fracturing operation, the fracture then closes on the proppant and applies pressure on the resin-coated particulates, causing the particles to be forced into contact with each other while the resin composition hardens. The hardening of the resin composition under pressure brings about the consolidation of the resin-coated proppant particles into a hard permeable mass having compressive and tensile strength meant to prevent unconsolidated particulates and formation sand from flowing out of the fractures with produced fluids. Flowback of formation sand with produced fluids is undesirable as it may erode metal equipment, plug piping and vessels, cause damage to valves, instruments, and other production equipment, and ultimately reduce the potential production of the well.

SUMMARY OF THE INVENTION

The present invention involves coated proppant slurries and using such slurries in subterranean applications such as production enhancement and sand control. More particularly, the present invention relates to stable resin-coated proppant suspensions that need not be immediately used once they are formed.

Some embodiments of the present invention provide methods of creating a stable slurry of coated particulates wherein the slurry is capable of being stored for at least 2 hours before use comprising the steps of: providing resin coated particulates wherein the resin comprises a resin that does not completely cure unless it is at least one of exposed to a temperature above about 175° F. or exposed to an external catalyst; and, substantially suspending the resin coated particulates in a servicing fluid to create a stable resin coated particulate slurry.

Other embodiments of the present invention provide methods of creating a stable slurry of coated particulates wherein the slurry is capable of being stored for at least 2 hours before use comprising the steps of: providing tackifier coated particulates; and, substantially suspending the tackifier coated particulates in a servicing fluid to create a tackifier coated particulate slurry.

The features and advantages of the present invention will be readily apparent to those skilled in the art upon a reading of the description of preferred embodiments that follows.

DESCRIPTION OF PREFERRED EMBODIMENTS

The present invention involves coated proppant slurries and using such slurries in subterranean applications such as production enhancement and sand control. More particularly, the present invention relates to stable resin-coated proppant suspensions that need not be immediately used once they are formed.

Some embodiments of the present invention describe methods of creating stable slurries of coated particulates comprising the steps of coating particulates with a resin or a tackifying compound and then substantially suspending the coated particulates in a servicing fluid to create a coated particulate slurry. Resins suitable for use in the present invention include those resins that do not fully cure until they are exposed to either temperatures above about 175° F. or an external catalyst. Tackifiers suitable for use in the present invention may be either used such that they form a non-hardening coating or they may be combined with a multifunctional material capable of reacting with the tackifying compound to form a hardened coating. The coated particulate slurries of the present invention are stable enough that they may be formed and used some time later. That is, the slurried particulates are retained in the fluidized state without significant settling during the period of time between when the slurry is made and when it is use in a subterranean operation.

The coated particulates of the present invention may be created in advance and, in the case of a resin or a hardened tackifyed coating, allowed to completely or partially cure or they may be coated directly before being substantially suspended in a servicing fluid.

Any high temperature curable resin that does not completely cure until exposed to temperatures above about 175° F. is suitable for use as a resin component in the present invention. When such resins are used, the resin on the particulate will not fully cure until it is placed in an environment, such as a subterranean formation, having a temperature of above about 175° F. Where the coated particulates slurries of the present invention are used in subterranean formations that are cooler than 175° F., an after-flush solution comprising an external catalyst may be applied to the coated particulates after they are placed in the subterranean formation. The use of an external catalyst to effect resin consolidation at reduced temperatures is known in the art, and it is within the ability of one skilled in the art, with the benefit of this disclosure, to select a suitable external catalyst based on the resin chosen and the subterranean conditions. Examples of suitable external catalysts include, but are not limited to, hydrochloric acid, phosphoric acid, acetic acid, fumaric acid, sulfonic acid, and combinations thereof. Examples of suitable external catalysts are hydrochloric acid, phosphoric acid, acetic acid, fumaric acid, sulfonic acid, and combination thereof.

Resins that do not completely cure until exposed to temperatures above about 175° F. are known in the art. Examples include, but are not limited to, furan-based resins, phenolic-based resins, and high-temperature (HT) epoxy-based resins. It is within the ability of one skilled in the art, with the benefit of this disclosure, to select a suitable resin.

Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use with furan-based resins include, but are not limited to 2-butoxy ethanol, butyl acetate, and furfuryl acetate.

Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use with phenolic-based resins include, but are not limited to, butyl acetate, butyl lactate, furfuryl acetate, and 2-butoxy ethanol.

Suitable HT epoxy-based resins include, but are not limited to, bisphenol A-epichlorohydrin resins, polyepoxide resins, novolac resins, glycidyl ethers and mixtures thereof. Of these, bisphenol A-epichlorohydrin resins are preferred. A HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. A co-solvent such as a dipropylene glycol methyl ether, dipropylene glycol dimethyl ether, dimethyl formamide, dimethyl sulfoxide, diethylene glycol methyl ether, ethylene glycol butyl ether, diethylene glycol butyl ether, propylene carbonate, d-limonene and fatty acid methyl esters, may also be used in combination with the solvent.

Resins suitable for use in the present invention may be combined with an optional hydrolyzable ester. When used, the hydrolyzable ester is generally included in the resin in an amount ranging from about 0.1 to about 3% by weight of the resin composition. Resin systems suitable for use in the present invention also may be combined with an optional silane coupling agent. Suitable silane coupling agents include, but are not limited to, n-2-(aminoethyl)-3-amino-propyltrimethoxysilane, 3-glycidoxypropyltrimethoxysilane, and n-beta-(aminoethyl)-gamma-aminopropyl trimethoxysilane. Where used, the silane coupling agent is generally included in the resin in an amount ranging from about 0.1% to about 3% by weight of the resin composition. Resin systems suitable for use in the present invention also may be combined with an optional surfactant. Suitable surfactants include, but are not limited to, an ethoxylated nonyl phenol phosphate ester, mixtures of one or more cationic surfactants, and one or more non-ionic surfactants with an alkyl phosphonate surfactant. Where used, the surfactant is generally included in the resin in an amount ranging from about 1% to about 15% by weight of the resin composition.

Compositions suitable for use as tackifying compounds in the present invention comprise any compound that, when in liquid form or in a solvent solution, will form a non-hardening coating upon a particulate. A particularly preferred group of tackifying compounds comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Suitable tackifying compounds are described in U.S. Pat. No. 5,853,048 issued to Weaver, et al., U.S. Pat. No. 5,839,510 issued to Weaver, et al., and U.S. Pat. No. 5,833,000 issued to Weaver, et al., the relevant disclosures of which are herein incorporated by reference.

Tackyfiers suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying compound also functions as the hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be admixed with the tackifying compound in an amount of from about 0.01 to about 50 percent by weight of the tackifying compound to effect formation of the reaction product. In some preferably embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Particulates suitable for use in the present invention may be comprised of any material suitable for use in subterranean operations, including graded sand, bauxite, ceramic materials, glass materials, metal beads or balls, nut hulls, polymer beads, and the like. The particulate size generally may range from about 2 to about 400 on the U.S. Sieve Series, however, it is to be understood that in certain circumstances other sizes may be desired and will be entirely suitable for practice of the present invention. In some embodiments of the present invention, the particulate is graded sand having a particle size in the range of from about 10 to about 70 mesh, U.S. Sieve Series. It is within the ability of one skilled in the art, with the benefit of this disclosure, to select a suitable particulate composition and size.

The coated particulates of the present invention may be suspended in any servicing fluid known in the art, including aqueous gels, foams, emulsions, and viscosified fluids. Suitable aqueous gels are generally comprised of water and one or more gelling agents. The emulsions may be comprised of two or more immiscible liquids such as an aqueous gelled liquid and a liquefied, normally gaseous fluid, such as nitrogen. The preferred servicing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked servicing fluid, inter alia, reduces fluid loss and allows the fracturing fluid to transport significant quantities of suspended particulates. The servicing fluids may also include one or more of a variety of well-known additives such as breakers, stabilizers, fluid loss control additives, clay stabilizers, bactericides, and the like.

The slurries of the present invention may be created off-site from their location of final use and yet retain the ability to provide consolidation when used. In some embodiments of the present invention, the slurries may be created a few hours or a few weeks before they are used. A "stable" slurry of the present invention refers to a slurry in which the coated particulates are substantially slurried in the servicing and are retained in the fluidized state without significant settling during the period of time between when the slurry is made and when it is use in a subterranean operation. Moreover, in the stable slurries of the present invention the particulates retain their character as individual grains or small clusters, without forming large flocculations or aggregates. The stable slurries of the present invention are capable of being stored for 2 hours or longer after they are formed and before they are used in a subterranean operation.

Where it is desirable to store the slurry for a period of time longer than about a few hours, the viscoelastic properties of the servicing fluid must be controlled to ensure that the particulates remain suspended. U.S. Pat. No. 5,799,734, the relevant disclosure of which is herein incorporated by reference, describes such fluids and methods of their creation. Desirable viscoelastic properties of servicing fluids suitable for use in forming slurries that may be stored for more than a few hours without significant settling are: (1) apparent viscosity (at a shear rate of 1) from about 40,000 cp to about 200,000 cp; (2) Maxwellian Stress Relaxation of from about 1 to about 3 minutes; and (3) Maxwellian Equilibrium Limit from about 0.035 to about 0.1. In some embodiments of the present invention, the slurry may be diluted with a less viscous servicing fluid at the well site directly before use in the subterranean formation. In that way, the desirable viscoelastic properties help maintain the stability of the slurry after it is formed and yet a lower viscosity fluid can actually be used in the subterranean treatment.

Some embodiments of the methods of the present invention provide methods for creating stable slurries of coated particulates comprising the steps of coating a particulate with a resin or a tackifying compound and then substantially slurrying the coated particulates in a servicing fluid to create a coated particulate slurry.

Other embodiments of the present invention provide methods of propping a fractured subterranean formation comprising the steps of coating a particulate with a resin or a tackifying compound and then substantially suspending the coated particulates in a fracturing fluid to create a coated particulate slurry, and placing the coated particulate slurry into at least one fracture in the subterranean formation.

Where the fracturing methods of the present invention are used on subterranean formations that exhibit a temperature of below about 175° F., and a resin coating is used, after the step of placing the resin coated particulate suspension into a fracture the method may further comprise the step of placing into the subterranean formation an after-flush solution comprising an external catalyst capable of causing the resin to cure.

Still other embodiments of the present invention provide methods of installing a gravel pack in a well bore comprising the steps of coating a particulate with a resin or a tackifying compound and then substantially suspending the coated particulates in a fracturing fluid to create a coated particulate slurry, and introducing the coated particulate slurry to the well bore such that the coated particulates form a gravel pack substantially adjacent to the well bore. Where the gravel packing methods of the present invention are used on well bores that exhibit a temperature of below about 175° F., and a resin coating is used, after the step of forming a gravel pack substantially adjacent to the well bore, the method may further comprise the step of placing an after-flush solution comprising an external catalyst into the subterranean formation.

To facilitate a better understanding of the present invention, the following examples of some of the preferred embodiments are given. In no way should such examples be read to limit the scope of the invention.

EXAMPLES

Example 1

Both high-temperature epoxy resin and furan resin systems were evaluated to determine their suitability for use in as resin components of the present invention. For each resin system, a volume of 7.5 mL of resin was coated directly onto 250 grams of dry bauxite proppant. The resin-coated proppant was then mixed with 300 mL of 35 lbs/Mgal uncrosslinked carboxymethyl hydroxypropyl guar fracturing fluid. The suspension was then allowed to sit at approximately 74° F. for from 1 day to 14 days. Next, a zirconium crosslinker was added to the suspension and it was subjected to heating in the hot bath and stirring at 180° F. for 60 minutes to simulate the effect of pumping downhole and suspending in created fractures. After stirring period, the resin-treated proppant was packed into brass chamber and cured at 325° F. for 24 hours without applying any stresses. After curing, the consolidated cores were obtained for unconfined compressive strength measurements (Table 1).

TABLE 1

| Suspension time in gelled fluid at 74° F. | Unconfined Compressive Strengths (psi) | |
| --- | --- | --- |
|  | Epoxy resin | Furan resin |
| 1 day | 1265 | 1200 |
| 7 days | 1390 | 825 |
| 14 days | 930 | 1080 |

Table 1 illustrates that epoxy and furan resins are both suitable for use in the present invention, even where the mixtures were formed two weeks before use.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of installing a gravel pack in a well bore comprising the steps of:
   providing resin coated particulates wherein the resin comprises a resin that does not completely cure unless it is at least one of:
      exposed to a temperature above about 175° F. or
      exposed to an external catalyst;
   providing a gravel packing fluid;
   substantially slurrying the resin coated particulates in the gravel packing fluid to create a resin coated particulate slurry wherein the slurry is capable of being stored for at least 2 hours before use;
   introducing the resin coated particulate mixture to the well bore such that the resin coated particulates form a gravel pack substantially adjacent to the well bore; and,
   allowing the resin coated particulates to substantially cure.

2. The method of claim 1 wherein the high temperature curable resin is selected from the group consisting of a furan-based resin, a phenolic-based resin, a high-temperature (HT) epoxy-based resin, a phenol/phenol formaldehyde/furfuryl alcohol resin, and a combination thereof.

3. The method of claim 1 wherein the high temperature curable resin further is selected from the group consisting of a hydrolyzable ester, a silane coupling agent, a surfactant, and a combination thereof.

4. The method of claim 1 where in the external catalyst is selected from the group consisting of hydrochloric acid, phosphoric acid, acetic acid, fumaric acid, sulfonic acid, and combinations thereof.

5. The method of claim 1 wherein the gravel packing fluid is selected from the group consisting of an aqueous gel, a foam, an emulsion, a crosslinked viscosified fluid, and a combination thereof.

6. The method of claim 1 wherein the high temperature curable resin is coated onto the particulates on-the-fly.

7. The method of claim 1 wherein the well bore exhibits a temperature at above about 175° F.

8. The method of claim 1 wherein the subterranean formation exhibits a temperature of below about 175° F. and further comprising, after the step of introducing the resin coated particulate slurry to the well bore such that the resin coated particulates form a gravel pack substantially adjacent to the well bore, the step of
   placing an after-flush solution comprising an external catalyst into the well bore.

9. The method of claim 1 wherein the gravel packing fluid has an apparent viscosity (at a shear rate of 1) from about 40,000 cp to about 200,000 cp; a maxwellian stress relaxation of from about 1 to about 3 minutes; and a maxwellian equilibrium limit from about 0.035 to about 0.1.

10. A method of installing a gravel pack in a well bore comprising the steps of:
   providing tackifier coated particulates;
   providing a gravel packing fluid;
   substantially slurrying the tackifier coated particulates in the gravel packing fluid to create a tackifier coated particulate slurry wherein the slurry is capable of being stored for at least 2 hours before use; and,
   introducing the tackifier coated particulate slurry to the well bore such that the tackifier coated particulates form a gravel pack substantially adjacent to the well bore.

11. The method of claim 10 wherein the tackifier is selected from the group consisting of a polyamide, a polyester, a polycarbonate, polycarbamate, a natural resin, and a combination thereof.

12. The method of claim 10 wherein the gravel packing fluid is selected from the group consisting of an aqueous gel, a foam, an emulsion, a crosslinked viscosified fluid, and a combination thereof.

13. The method of claim 10 wherein the tackifier is coated onto the particulates on-the-fly.

14. The method of claim 10 further comprising the step of:
combining the tackifier coated particulates with a multifunctional material before the step of:
substantially suspending the tackifier coated particulates in a servicing fluid to create a tackifier coated particulate slurry wherein the slurry is capable of being stored for at least 2 hours before use.

15. The method of claim 10 wherein the multifunctional material is selected from the group consisting of an aldehyde; a dialdehyde; a hemiacetal; an aldehyde releasing compound; a diacid halide; a dihalide; a polyacid anhydride; an epoxide; furfuraldehyde, glutaraldehyde or aldehyde condensates; and combinations thereof.

16. The method of claim 10 wherein the gravel packing fluid has an apparent viscosity (at a shear rate of 1) from about 40,000 cp to about 200,000 cp; a maxwellian stress relaxation of from about 1 to about 3 minutes; and a maxwellian equilibrium limit from about 0.035 to about 0.1.

* * * * *